March 14, 1939. J. L. CAMENZIND 2,150,488
CRACKER CRUMBER
Filed March 1, 1938
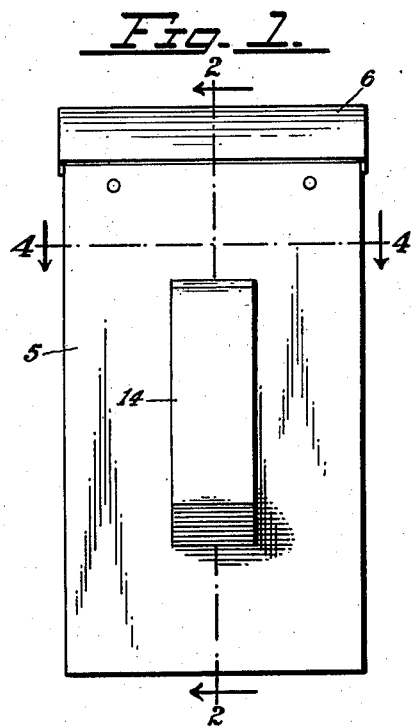
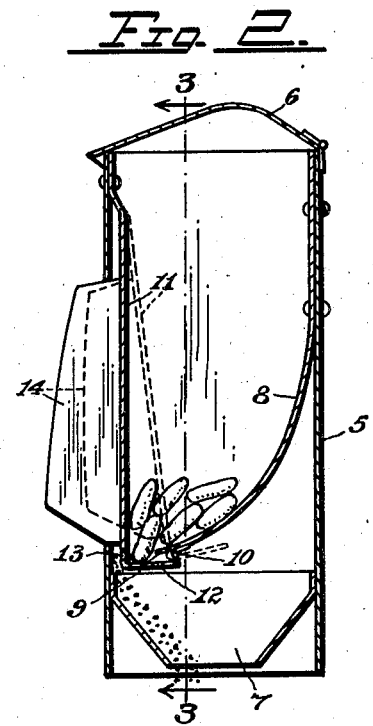
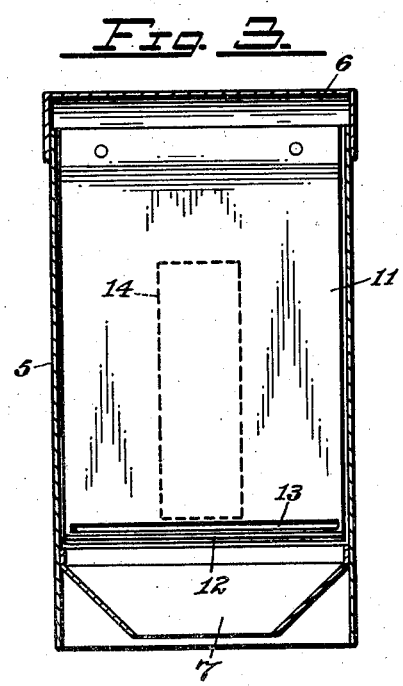
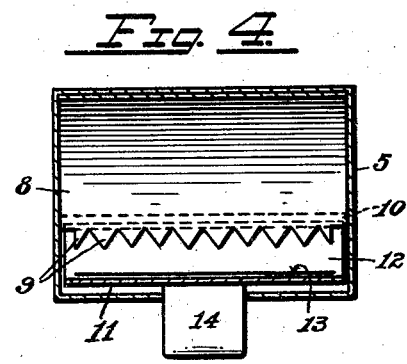
Inventor
John L. Camenzind
By John W. Maukin.
Attorney Patented Mar. 14, 1939

2,150,488

UNITED STATES PATENT OFFICE 2,150,488

CRACKER CRUMBER

John L. Camenzind, Montesano, Wash.

Application March 1, 1938, Serial No. 193,301

2 Claims. (Cl. 146—63)

My invention relates to cracker crumbers and more specifically to a device for manually breaking or crushing crackers into crumbs for use in soup or the like. The primary objects of the invention are to provide a device of this character for use in restaurants or homes, and whereby crackers placed therein are converted into crumbs and discharged into a soup plate or the like by pressure of the hand. Further objects are to provide a device for converting crackers into crumbs which is entirely sanitary due to the fact that the crackers never come into contact with human hands.

In the drawing:

Figure 1 is a view in front elevation of the cracker crumber;

Fig. 2 is a view in vertical section taken substantially on a broken line 2—2 of Fig. 1;

Fig. 3 is a view in vertical section taken substantially on a broken line 3—3 of Fig. 2; and Fig. 4 is a view in horizontal section taken on a broken line 4—4 of Fig. 1.

Referring now in detail to the drawing wherein like reference numerals indicate like parts in the several views, the numeral 5 designates an upstanding rectangular casing or receptacle, open at both ends, and having a lid 6 hinged to its top. A discharge hopper 7 is installed in its lower end and terminates slightly short of its bottom.

A chute 8 has its upper portion secured to the rear wall of the casing 5 by means of rivets or the like. Said chute extends downward and is curved outward, terminating a short distance from the front casing wall and slightly above the discharge hopper 7. This chute is stationary, extends from one side wall to the other of the casing, and its lower end is cut to form a series of teeth 9. A small depending lip 10 is fixed to the end of said chute close to its teeth and extends the entire width of the chute as shown in dotted lines in Fig. 4 of the drawing.

A spring plate 11 has its upper end secured to the front wall of the casing 5 by means of rivets or the like. Said plate extends downward to a point slightly below the lower end of the chute 8 where it is bent to form an L-end 12 which extends inward to a point slightly beyond the teeth 9 where it impinges the lower end of the lip 10. A slot 13 extends most all the way across the lower end of the spring plate close to its L-end and is arranged to receive the teeth 9 of the chute 8. A knob or other boss member 14 is secured to said spring plate and extends exteriorly through a slot in the front wall of the casing 5.

In the use and operation of the device, crackers are emptied into the top of the casing 5 from their original packages. These crackers gravitate to the bottom portion of the device and rest on the lower curved end of the chute 8 and on the L-end of the spring plate 11. One or two of the crackers rest on the L-end directly between the teeth 9 of the chute 8 and the slot 13 of the spring plate 11. Now, by pressing inwardly on the knob 14, the spring plate 11 is moved to the position shown in dotted lines in Fig. 2, with the teeth 9 projecting through the slot 13. In this movement, the teeth crush the crackers and, aided by the small lip 10, force the resultant cracker crumbs through the slot 13 whereby they may be dropped into a plate of soup through the discharge hopper 7. Pressure on the knob 14 is, of course, intermittently continued, allowing the spring plate to spring outwardly each time. The elements of the device are close fitting so that no crumbs escape except when it is in actual use. It will now be apparent that I have provided a simple, inexpensive, convenient and sanitary means for converting crackers into crumbs and discharging them for edible use.

I claim:

1. A cracker crumber consisting of an upstanding casing having front, side and rear walls, a chute having its upper portion fixed to the rear wall and its lower portion curved outward and terminating a short distance from the front wall, teeth formed on the lower end of said chute, a spring plate having its upper end fixed to the front wall and extending to a point slightly below the lower end of the chute, the lower end of said spring plate bent to form an L-end extending to a point slightly beyond said teeth, and said spring plate having a slot arranged to receive said teeth when the spring plate is moved inwardly.

2. A cracker crumber consisting of an upstanding casing having front, rear and side walls and a hinged top, a chute having its upper portion fixed to the rear wall and its lower portion curved outward and terminating a short distance from the front wall, teeth formed on the lower end of said chute, a spring plate having its upper end fixed to the front wall and extending downward to a point slightly below the lower end of the chute, the lower end of said spring plate bent to form an L-end extending to a point slightly beyond the teeth, a small depending lip fixed to the lower end of the chute close to its teeth and arranged to impinge the L-end of the spring plate, said spring plate having a slot arranged to receive the teeth when the spring plate is pressed inwardly, a knob fixed to the spring plate and projecting through the front wall of the casing for the purpose of manually pressing the spring plate inwardly, and a discharge hopper fixed into the lower end portion of the casing.

JOHN L. CAMENZIND.